US007205896B2

(12) United States Patent
Wu et al.

(10) Patent No.: US 7,205,896 B2
(45) Date of Patent: Apr. 17, 2007

(54) RFID READER HAVING MULTI-DIMENSIONAL ANTENNA ARRAY

(75) Inventors: Che-Ming Wu, HsinChu (TW); Tien-Fa Hou, HsinChu (TW)

(73) Assignee: G-Time Electronic Co., Ltd., Hsinchu (TW)

( * ) Notice: Subject to any disclaimer, the term of this patent is extended or adjusted under 35 U.S.C. 154(b) by 205 days.

(21) Appl. No.: 11/062,815

(22) Filed: Feb. 23, 2005

(65) Prior Publication Data

US 2006/0187051 A1 Aug. 24, 2006

(51) Int. Cl.
*G08B 13/14* (2006.01)
*H04Q 5/22* (2006.01)

(52) U.S. Cl. ............................... 340/572.1; 340/572.7; 340/10.51; 343/893

(58) Field of Classification Search ............. 340/572.1, 340/572.7, 10.1, 10.51; 343/729, 751, 824, 343/893
See application file for complete search history.

(56) References Cited

U.S. PATENT DOCUMENTS 6,762,726 B2 * 7/2004 Alden et al. ................ 343/703
6,825,816 B2 * 11/2004 Aikawa et al. ............. 343/770

* cited by examiner

*Primary Examiner*—Toan N. Pham

(57) ABSTRACT

An RFID reader having a multi-dimensional antenna array makes use of electronic circuits to change the antennas or coils of an RFID device to form a multi-dimensional antenna array, thereby accomplishing detection of the ID codes of RFID tag devices in a scanning way of the RFID technology. This scanning method can also actively discriminate the locations of RFID tag devices. The RFID reader having a multi-dimensional antenna array can scan a plurality of RFID tag devices, and can also effectively discriminate the locations of these RFID tag devices.

19 Claims, 8 Drawing Sheets

RFID READER HAVING MULTI-DIMENSIONAL ANTENNA ARRAY

BACKGROUND OF THE INVENTION

1. Field of the Invention

The present invention relates to an RFID reader and, more particularly, to an RFID reader having a multi-dimensional antenna array.

2. Description of Related Art

Products related to RFID systems have gradually been used in the industry, military and people's livelihood applications such as commodities barcode, logistics management, consumer electronic products, biomedical sensing, machine assembly, and so on. The RFID technology will certainly have a revolutionary influence to people lives in the future. Although the principle of this technology was proposed by Maxwell in the mid 19$^{th}$ century and has been developed for over one hundred years to come to maturity, its related applications have come into notice only recently. The reason why the RFID technology develops vigorously is that a all-new application is proposed in addition to the maturity of fabrication and design. For example, in the disclosure of TW Pat. No. TW565,802 "an object tracking and management system and method making use of RFID tags," the RFID technology is applied to object tracking and management.

As shown in FIG. 1, a conventional RFID reader comprises an emission module 11, a signal receiving module 13, a resonator 15 and a microprocessor module 17. The emission module 11 is composed of a stabilized oscillation source circuit 101 and a power amplifier 103. The primary function of the emission module 11 is to provide a carrier frequency signal for the resonator 15. The resonator 15 is composed of an antenna 105 (or coil) and a capacitor 107, and is used to produce a time-varying EM field for providing an induction voltage for an RFID tag device 63. When the RFID tag device 63 gets a sufficient operation voltage, its internal ID code will be transmitted back to the RFID reader through EM induction. The signal receiving module 13 is composed of a Envelope detector 109 and an appropriate filtering and amplification circuit 111. The signal receiving module 13 is used to demodulate the ID code and restore it to a digital signal of logic level "0" or "1". This restored digital signal will be processed by the microprocessor module 17. The microprocessor module 17 is a control center of the whole RFID reader, and is used for related control of recording, determination, decryption and different applications.

In the above conventional RFID system, the resonator 15 uses the single antenna 105 to match several RFID tag devices for one (the RFID reader) to many (the RFID tag devices) application. The primary drawback is that the RFID reader can only passively await the approach of an RFID tag device within the emission EM field range of this antenna.

Accordingly, the present invention aims to propose an RFID reader having a multi-dimensional antenna array to solve the above problems in the prior art.

SUMMARY OF THE INVENTION

An object of the present invention is to provide an RFID reader having a multi-dimensional antenna array. The RFID reader makes use of a plurality of antennas to read ID codes of RFID tag devices within a wider range.

Another object of the present invention is to provide an RFID reader having a multi-dimensional antenna array. The RFID reader makes use of a plurality of antennas to actively discriminate the locations of RFID tag devices in a scanning way.

To achieve the above objects, the RFID reader having a multi-dimensional antenna array of the present invention comprises a resonator module and a controller. The resonator module is composed of an antenna array arranged in one to multiple dimensions and a resonance capacitor. The controller can arbitrarily select an antenna in the antenna array to receive a carrier frequency signal emitted by an emission module so that the selected antenna can produce an EM field. Whether there is any RFID tag device is determined by scanning the emission EM field range of the antenna array. The controller then selects the ID code signal to enter a receiving module. Finally, a microprocessor records the ID code and the location of the RFID tag device.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

The present invention proposes an RFID reader having a multi-dimensional antenna array, which applies to RFID tag devices in the RFID technology. A controller is used to select an arbitrary antenna in the antenna array to accomplish scanning to RFID tag devices. The RFID reader having a multi-dimensional antenna array of the present invention can actively search RFID tag devices within the emission EM field range of the antenna array, and can record the ID codes and locations of the RFID tag devices.

Figure 1:
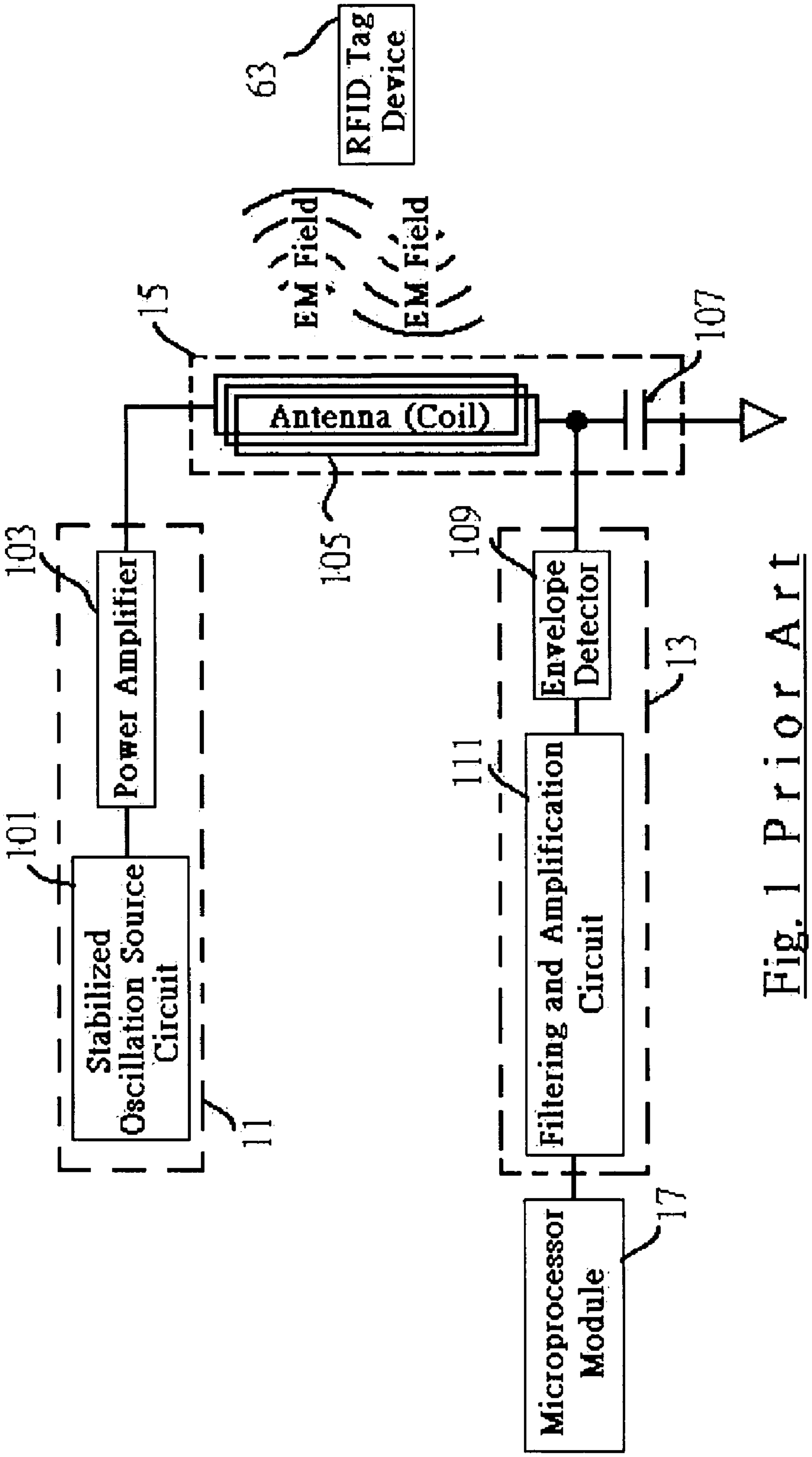
Fig. 1 Prior Art
FIG. 1 is a structure block diagram of the prior art.
Figure 2:
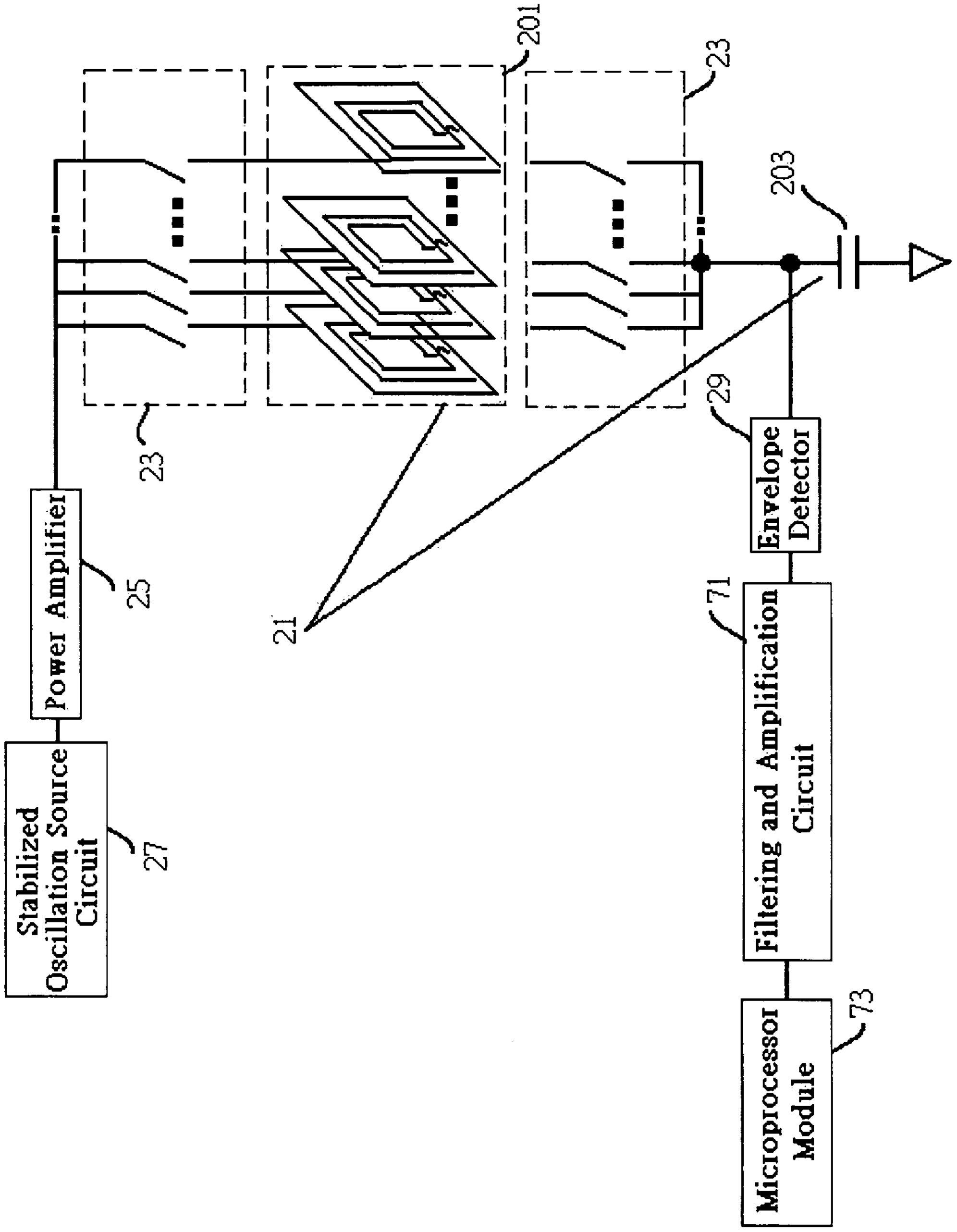
FIG. 2 is a circuit block diagram according to an embodiment of the present invention.

As shown in FIG. 2, an RFID reader having a multi-dimensional antenna array of the present invention comprises a resonator module 21 and a controller 23. The resonator module 21 is composed of an antenna array 201 arranged in one to multiple dimensions and a resonance capacitor 203. The controller 23 is used to selectively transmit a carrier frequency signal provided by a power amplifier 25 or an oscillation source circuit 27 to an antenna in the antenna array 201 for producing an EM field for sensing whether there is any RFID tag device within the detection range. An RFID tag device will produce an ID code signal when detecting the EM field. The ID code signal will be selected by the controller 23 to enter a Envelope detector 29 and a filtering and amplification circuit 71 so that a microprocessor 73 can record its ID code and location. By means of scanning of the RFID technology, the antenna array 201 can be activated arbitrarily one by one to record ID codes of RFID tag devices at different positions, hence accomplishing active searching and scanning. In other words, each antenna can be controlled for scanning through the antenna array 201 and the controller 23. As compared to the one (the RFID reader) to many (the RFID tag devices) system application in the prior art, the scanning way disclosed in the present invention can be defined as a many (scanning of the antenna array) to many (the RFID tag devices) system application.

Figure 3B:
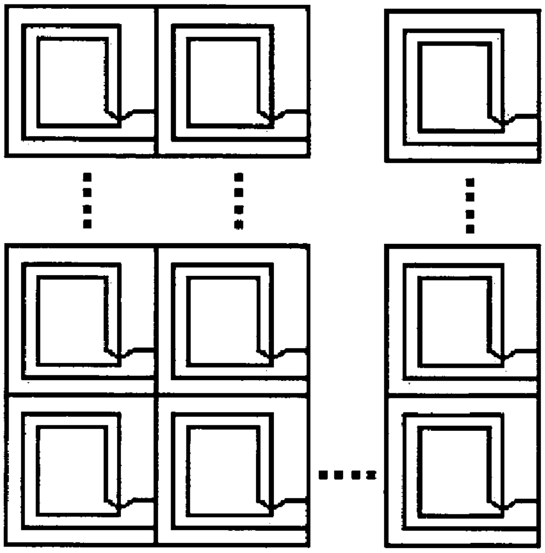
FIG. 3(B) is a two-dimensional antenna array according to an embodiment of the present invention.
Figure 3A:
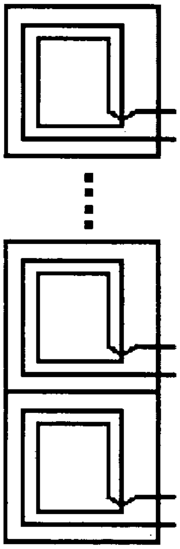
FIG. 3(A) is a one-dimensional antenna array according to an embodiment of the present invention.
Figure 3C:
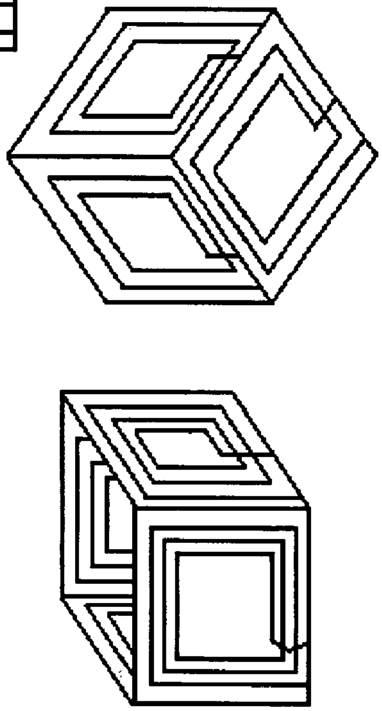
FIG. 3(C) is a three-dimensional antenna array according to an embodiment of the present invention.

Besides, the antenna array 201 in FIG. 2 can be arranged in one to multiple dimensions. FIG. 3(A) shows a one-dimensional antenna array, which can be activated by the controller 23 for linear scanning of RFID tag devices. FIG. 3(B) shows a two-dimensional antenna array, which can be activated by the controller 23 for linear scanning of RFID tag devices. FIG. 3(C) shows a three-dimensional antenna array, which can be activated by the controller 23 for linear scanning of RFID tag devices. The rest may be deduced by analogy. The antenna array of the present invention can thus apply to various multi-dimensional applications, which differ only in the arrangement way of the antenna array.

Figure 4B:
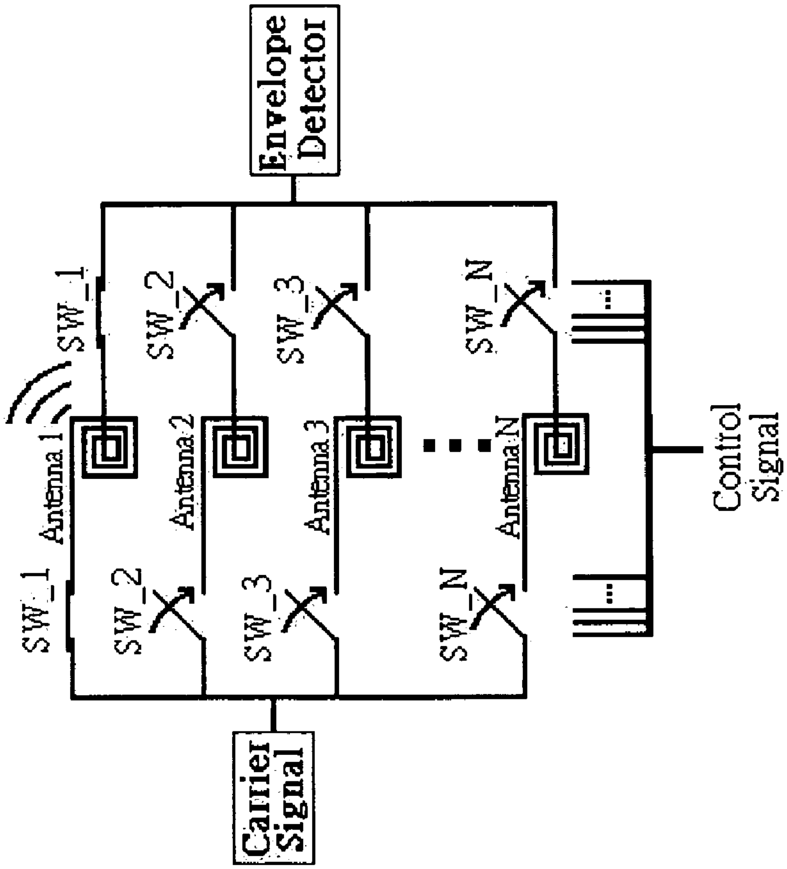
FIG. 4(B) is a diagram of a controller according to an embodiment of the present invention.
Figure 4A:
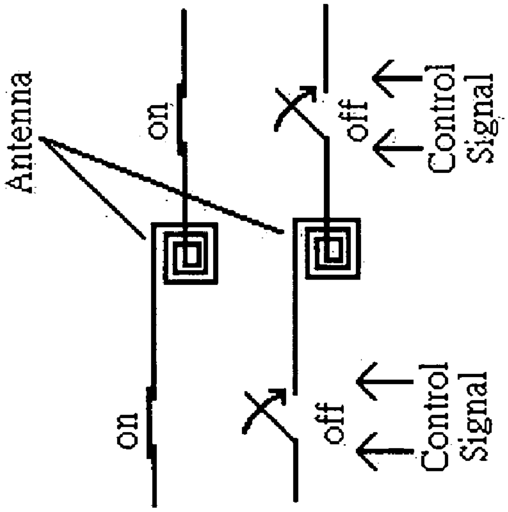
FIG. 4(A) is a diagram of a controller according to an embodiment of the present invention.
Figure 5:
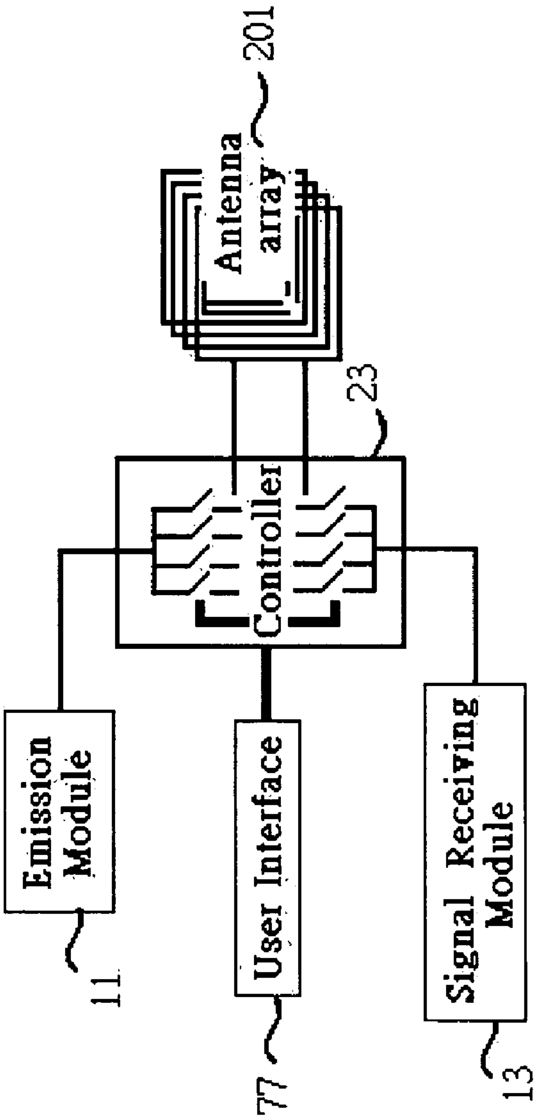
FIG. 5 is a diagram of another type of controller according to an embodiment of the present invention.

The controller 23 in FIG. 2 is used to control the carrier frequency signal to enter some antenna in the antenna array 201 for activation of this antenna for scanning. FIG. 4(A) shows two switch sets in the controller 23 for displaying the "on" and "off" states of the control signal. When the control signal is at the "on" state, the carrier frequency signal is allowed to enter the controlled antenna. Contrarily, when the control signal is at the "off" state, the carrier frequency signal is not allowed to enter the controlled antenna. The "on" and "off" states can be controlled by any type of signal. FIG. 4(B) shows the detailed operation of several switch sets in the controller 23. The controller 23 is used to turn on some switch set to accomplish the object of scanning. When the switch set "SW_1" is at the "on" state and other switch sets "SW_2" . . . "SW_N" are at the "off" state, whether there is any RFID tag device within the emission EM field range of the antenna 1 controller by the switch set "SW_1" is determined by means of scanning. If there is an RFID tag device, its location relative to the antenna 1 and its ID code are recorded. FIG. 5 shows another type of controller of the present invention. In addition to the signal of the microprocessor 73 in FIG. 2, the controller 23 can also receive different input signals such as the input from a user interface 77 or a sensor, or other trigger signals of similar type.

Figure 6:
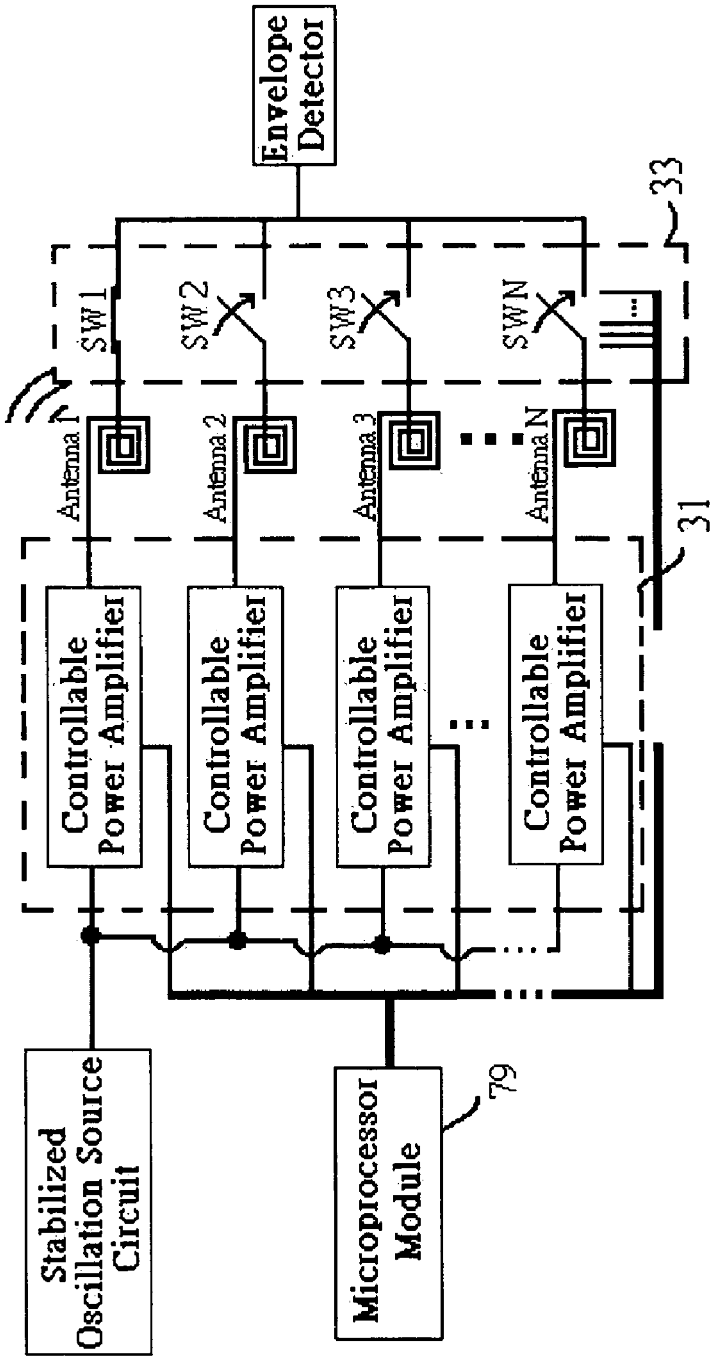
FIG. 6 is a diagram of yet another type of controller according to an embodiment of the present invention.

The controller 23 is primarily composed of a plurality of switch sets SW_1 . . . SW_N that can be controlled by a control signal. These switch sets SW_1 . . . SW_N have a high impedance at the "off " state for blocking the entrance of the carrier frequency signal. Contrarily, when some switch set is at the "on" state, its conductance impedance should not be higher than 100 K-Ohm. Otherwise, the carrier frequency signal can not effectively enter some antenna of the resonator module 21 to cause insufficient intensity of the EM field provided by this antenna, hence resulting malfunction of RFID tag devices. Moreover, in addition to directly controlling the carrier frequency signal to enter the antenna array 201, the controller 23 can also be combined with power amplifiers 25 to form a plurality of controllable power amplifiers 31, as shown in FIG. 6. Matched with controllable switch sets 33 (SW1, SW2 . . . SWN) at the receiving end, the scanning object of the present invention can also be accomplished. The controller 23 can receive different input signals such as the input from the microprocessor 79, a user interface 77 or a sensor, or other trigger signals of similar type.

Figure 7B:
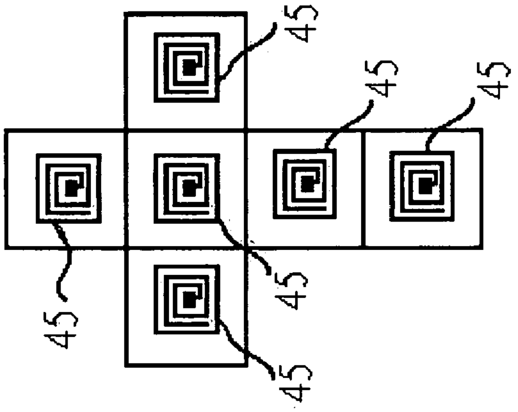
FIG. 7(B) is the unfolded planar view of each three-dimensional jigsaw according to an embodiment of the present invention.
Figure 7A:
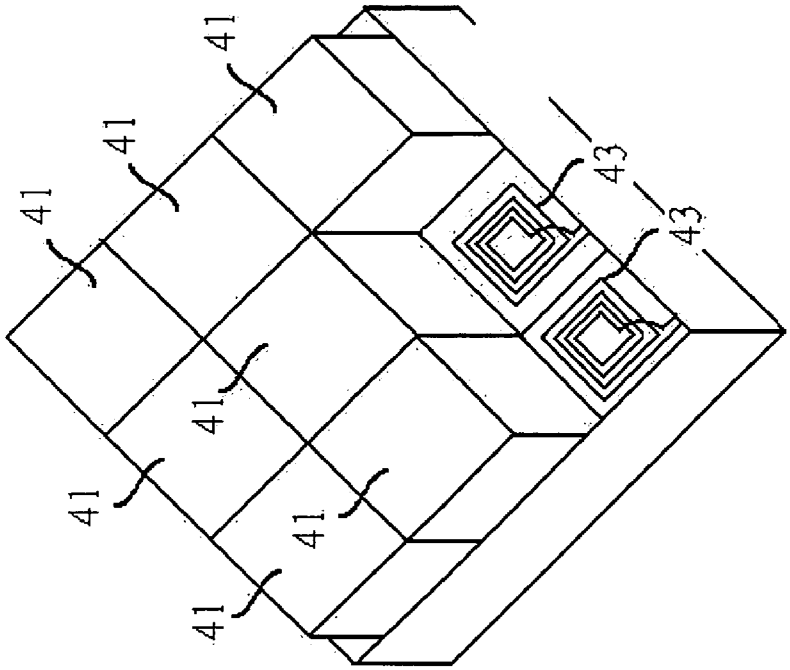
FIG. 7(A) is a structure diagram of a three-dimensional jigsaw having multimedia sound-and-light effect according to an embodiment of the present invention.

FIG. 7(A) is a perspective diagram of a three-dimensional jigsaw having multimedia sound-and-light effect according to an embodiment of the present invention. The unfolded planar view of each three-dimensional jigsaw unit 41 is shown in FIG. 7(B). An RFID tag device 45 is stuck on each face of the three-dimensional jigsaw. A jigsaw substrate 43 in FIG. 7(A) is primarily composed of a two-dimensional or three-dimensional antenna array. The ID code and the location of each antenna are received in the scanning way disclosed in the present invention to determine whether the result is correct. When all the ID codes received by the antennas are correct, meaning the jigsaw result is correct, sound-and-light rewards are given to the player. Besides, this way of scanning and application can also be used to make a smart electronic book, wherein an RFID tag device is used to make an electronic pen without the need of any battery for decreasing the pollution of battery to the environment, saving the cost, and accomplishing easy processing. Related information of the present location of the electronic pen can be accurately known through scanning of antenna.

Another embodiment of the present invention also discloses an electronic form of a conventional puzzle game on paper or game disk on paper. Commercially available related commodities generally include several dices, a game disk on paper, several game cards, game money, several chesses, and a game manual. The game is proceeded according to its instructions. Basically, after the dices are thrown, the chess jumps grids based on the total points of the dices. The grids have many states according to the game instructions. This kind of game on paper can be electronified by applying the present invention. For instance, several electronic dices can be made by using the above three-dimensional jigsaw units 41. The above RFID system is then used to read the points represented by different ID codes. When a correct point is read, the number of grids the chess needs to jump will be automatically calculated, and the game player is then informed through lights or in other ways. Moreover, an antenna array is fabricated on each grid of the game disk, and an RFID tag is stuck on the bottom face of each chess. After the dices are thrown and the number of grids the chess needs to jump is decided, in addition to informing the game player of the position of the chess to be placed, the controller will also activate an antenna for scanning to inform the microprocessor of which chess and to which grid to process subsequent game regulations. This is also within the application scope of the scanning method of the RFID technology disclosed in the present invention.

Figure 8B:
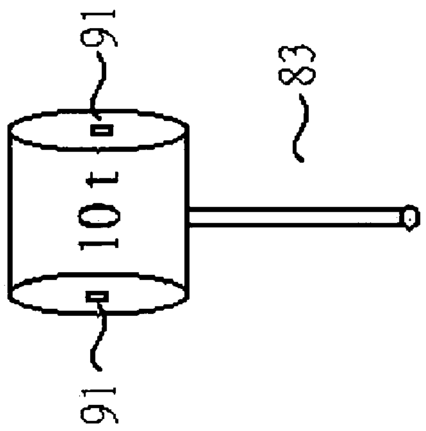
FIG. 8(B) is a structure diagram of hammer tool according to an embodiment of the present invention.
Figure 8A:
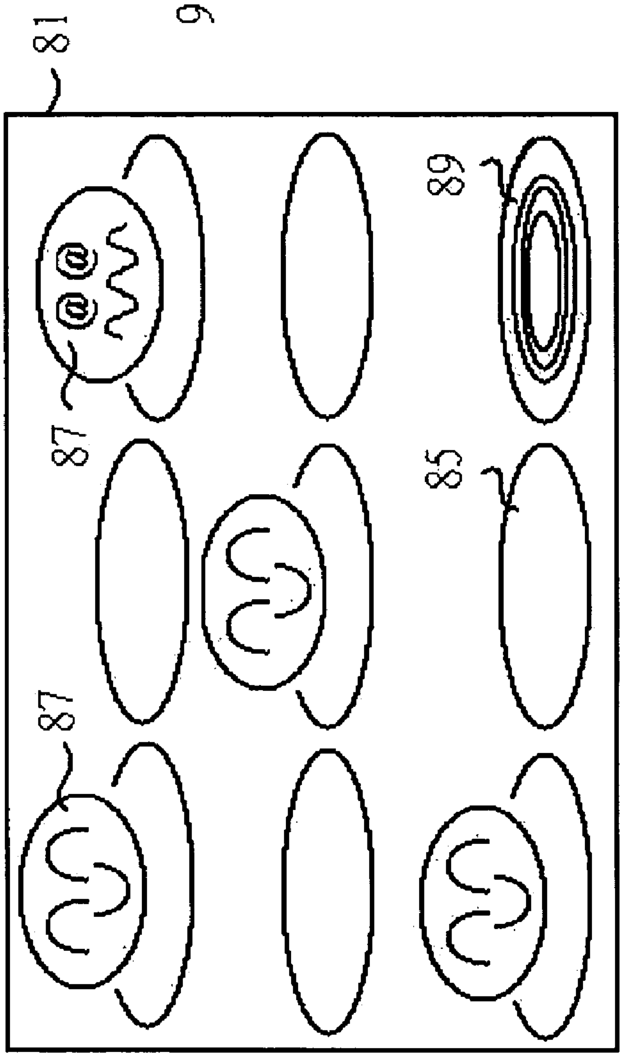
FIG. 8(A) is a structure diagram of a game machine according to an embodiment of the present invention.

Yet another embodiment of the present invention discloses a game machine capable of testing the response speed and challenging the wisdom of a user. A machine 81 shown in FIG. 8(A) is a structure diagram of a game machine of the present invention and has a display device 85 or a machine device whereon some patterns 87 can be displayed or appear. Several antenna arrays are placed on the display device 85.

The antenna 89 is a configuration of antenna array. One or several patterns 87 can randomly appear on the display device 85 at a time. When a pattern 87 appears, the antenna 89 belonging to its block will be activated. FIG. 8(B) is a structure diagram of hammer tool that shows an RFID tag 91 disposed on the hammer face of a hammer tool 83. This game is proceeded by using the hammer tool 83 to beat the appearing pattern 87. As stated above, when the pattern 87 appears, the antenna belonging to its block will be activated to await the beating of the hammer tool 83. During the beating process, if the antenna has received a correct ID code, it means that the corresponding pattern has been beaten. This is also within the application scope of the scanning method of the RFID technology disclosed in the present invention. Furthermore, several hammer tools 83 having different ID codes can be made. Which pattern 87 is beaten by which hammer tool 83 can thus be determined. A game machine for simultaneous play of multiple users can thus be obtained.

To sum up, the present invention makes use of the RFID technology to actively scan the ID codes and locations of RFID tag devices within the emission EM field range of an antenna array. The drawback that the RFID reader can only passively await the approach of an RFID tag device within the emission EM field range of an antenna in the prior art can thus be solved. Through various embodiments of the present invention, the depth and breadth of the present RFID system application can be enhanced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. An RFID reader having a multi-dimensional antenna array forming an RFID system with a plurality of RFID tag devices, said RFID reader comprising:

an emission module for producing a carrier frequency signal;

a resonator module comprising a plurality of antennas and a resonance capacitor, said antennas and said capacitor being electrically connected together and capable of receiving ID code signals emitted by said RFID tag devices;

a receiving module for receiving said ID code signals; and a controller capable of controlling said resonator module to connect said emission module so that an arbitrary one of said antennas can receive said carrier frequency signal and then produce a time-varying EM field, said controller being also capable of controlling said resonator module to connect said receiving module so that said resonator module can transmit said ID code signals to said receiving module.

2. The RFID reader having a multi-dimensional antenna array as claimed in claim 1, wherein said emission module comprises a power amplifier capable of producing said carrier frequency signal.

3. The RFID reader having a multi-dimensional antenna array as claimed in claim 1, wherein said emission module comprises an oscillation source circuit capable of producing said carrier frequency signal.

4. The RFID reader having a multi-dimensional antenna array as claimed in claim 1, wherein said receiving module comprises a Envelope detector and a filtering and amplification circuit.

5. The RFID reader having a multi-dimensional antenna array as claimed in claim 1 further comprising a microprocessor, which is connected to said controller and can produce a control signal to said controller.

6. The RFID reader having a multi-dimensional antenna array as claimed in claim 5, wherein said microprocessor further comprises a user interface.

7. The RFID reader having a multi-dimensional antenna array as claimed in claim 1, wherein said antennas form an antenna array arranged at least in one dimension.

8. An RFID reader having a multi-dimensional antenna array forming an RFID system with a plurality of three-dimensional jigsaws each having an RFID tag, said RFID reader comprising:

a machine with said three-dimensional jigsaws located on the surface thereof;

an emission module for producing a carrier frequency signal;

a resonator module comprising a plurality of antennas located on the surface of said machine and a resonance capacitor, said antennas and said capacitor being electrically connected together and capable of receiving ID code signals emitted by said RFID tag devices;

a receiving module for receiving said ID code signals; and a controller capable of controlling said resonator module to connect said emission module so that an arbitrary one of said antennas can receive said carrier frequency signal and then produce a time-varying EM field, said controller being also capable of controlling said resonator module to connect said receiving module so that said resonator module can transmit said ID code signals to said receiving module.

9. The RFID reader having a multi-dimensional antenna array as claimed in claim 8, wherein said emission module comprises a power amplifier capable of producing said carrier frequency signal.

10. The RFID reader having a multi-dimensional antenna array as claimed in claim 8, wherein said emission module comprises an oscillation source circuit capable of producing said carrier frequency signal.

11. The RFID reader having a multi-dimensional antenna array as claimed in claim 8, wherein said receiving module comprises a Envelope detector and a filtering and amplification circuit.

12. The RFID reader having a multi-dimensional antenna array as claimed in claim 8 further comprising a microprocessor, which is connected to said controller and can produce a control signal to said controller.

13. The RFID reader having a multi-dimensional antenna array as claimed in claim 8, wherein said antennas form an antenna array arranged at least in one dimension.

14. An RFID reader having a multi-dimensional antenna array comprising:

a plurality of antennas capable of producing an EM field and receiving ID code signals emitted by a plurality of RFID tag devices;

a resonance capacitor electrically connected with said antennas and capable of changing said EM field into a time-varying EM field; and a controller capable of controlling an arbitrary one of said antennas to receive a carrier frequency signal and then produce said EM field, said controller being also capable of transmitting said ID code signals to a receiving module.

15. The RFID reader having a multi-dimensional antenna array as claimed in claim 14, wherein said carrier frequency signal is transmitted from an emission module to said antennas.

16. The RFID reader having a multi-dimensional antenna array as claimed in claim 14, wherein said receiving module comprises a Envelope detector and a filtering and amplification circuit.

17. The RFID reader having a multi-dimensional antenna array as claimed in claim 14, wherein said antennas form an antenna array arranged in one dimension.

18. The RFID reader having a multi-dimensional antenna array as claimed in claim 14, wherein said antennas form an antenna array arranged in two dimensions.

19. The RFID reader having a multi-dimensional antenna array as claimed in claim 14, wherein said antennas form an antenna array arranged in three dimensions.

* * * * *